(12) United States Patent
Zeng et al.

(10) Patent No.: US 10,412,585 B2
(45) Date of Patent: Sep. 10, 2019

(54) USER IDENTITY AUTHENTICATION METHOD AND DEVICE

(71) Applicant: GUANGDONG OPPO MOBILE TELECOMMUNICATIONS CORP., LTD., Dongguan, Guangdong (CN)

(72) Inventors: Yuanqing Zeng, Dongguan (CN); Hai Tang, Dongguan (CN)

(73) Assignee: GUANGDONG OPPO MOBILE TELECOMMUNICAIONS CORP., LTD., Dongguan (CN)

( * ) Notice: Subject to any disclaimer, the term of this patent is extended or adjusted under 35 U.S.C. 154(b) by 0 days.

(21) Appl. No.: 15/745,347

(22) PCT Filed: Sep. 28, 2015

(86) PCT No.: PCT/CN2015/090943
§ 371 (c)(1),
(2) Date: Jan. 16, 2018

(87) PCT Pub. No.: WO2017/054110
PCT Pub. Date: Apr. 6, 2017

(65) Prior Publication Data
US 2018/0270658 A1   Sep. 20, 2018

(51) Int. Cl.
*H04M 3/16*   (2006.01)
*H04W 12/06*   (2009.01)
(Continued)

(52) U.S. Cl.
CPC ............ *H04W 12/06* (2013.01); *H04L 9/32* (2013.01); *H04L 9/3231* (2013.01);
(Continued)

(58) Field of Classification Search
None
See application file for complete search history.

(56) References Cited

U.S. PATENT DOCUMENTS

2004/0030887 A1   2/2004   Harrisville-Wolff
2006/0053296 A1*  3/2006   Busboom ............ H04L 63/083
                                                  713/182
(Continued)

FOREIGN PATENT DOCUMENTS

CN   101409880 A   4/2009
CN   101442733 A   5/2009
(Continued)

OTHER PUBLICATIONS

English Translation of International Search Report in international application No. PCT/CN2015/090943, dated Jul. 12, 2016.
(Continued)

*Primary Examiner* — Khalid W Shaheed
(74) *Attorney, Agent, or Firm* — Ladas & Parry LLP

(57) ABSTRACT

A user identity authentication method is provided, which includes that: a Service Provider (SP) device receives a user request sent by a terminal, the user request including an identity credential of a user; the SP device determines an Identifier (ID) of the user and a priority of the identity credential according to the user request; and the SP device enables corresponding service for the terminal according to the priority. In the embodiment, the SP device provides the corresponding service according to the identity credential of the user. Therefore, a Unified security identity authentication manner may be implemented, usability is improved, and optimal utilization of resources may be implemented.

20 Claims, 13 Drawing Sheets

(51) Int. Cl.
 H04L 9/32 (2006.01)
 H04W 8/18 (2009.01)
 H04W 12/08 (2009.01)
 H04L 29/06 (2006.01)
 H04W 88/02 (2009.01)

(52) U.S. Cl.
 CPC .......... H04L 9/3247 (2013.01); H04L 9/3263 (2013.01); H04L 63/0823 (2013.01); H04W 8/183 (2013.01); H04W 12/08 (2013.01); H04W 88/02 (2013.01)

(56) References Cited

U.S. PATENT DOCUMENTS

| | | | |
|---|---|---|---|
| 2006/0189298 A1* | 8/2006 | Marcelli | H04L 63/0869 455/411 |
| 2007/0226785 A1* | 9/2007 | Chow | H04L 63/08 726/8 |
| 2008/0065895 A1 | 3/2008 | Liu | |
| 2014/0068700 A1* | 3/2014 | Reilly | H04L 63/20 726/1 |
| 2014/0201809 A1 | 7/2014 | Choyi et al. | |
| 2015/0227724 A1 | 8/2015 | Grigg et al. | |
| 2015/0312257 A1* | 10/2015 | Antipa | H04L 63/10 709/225 |
| 2016/0155189 A1 | 6/2016 | Grigg et al. | |
| 2016/0171460 A1 | 6/2016 | Grigg et al. | |
| 2017/0070503 A1 | 3/2017 | Choyi et al. | |

FOREIGN PATENT DOCUMENTS

| | | |
|---|---|---|
| CN | 101453328 A | 6/2009 |
| CN | 101567878 A | 10/2009 |
| CN | 101317362 B | 1/2012 |
| CN | 102307097 A | 1/2012 |
| CN | 103188076 A | 7/2013 |
| CN | 103209160 A | 7/2013 |
| CN | 104717648 A | 6/2015 |

OTHER PUBLICATIONS

The Written Opinion of the International Search Authority in international application No. PCT/CN2015/090943, dated Jul. 12, 2016.
Supplementary European Search Report in European application No. 15905022.8, dated Nov. 22, 2018.

* cited by examiner

USER IDENTITY AUTHENTICATION METHOD AND DEVICE

RELATED APPLICATION

This application is an application under 35 U.S.C. 371 of International Application No. PCT/CN2015/090943 filed on Sep. 28, 2015, the entire contents of which are incorporated herein by reference.

TECHNICAL FIELD

Embodiments of the disclosure relate to the field of communications, and more particularly to a user identity authentication method and device.

BACKGROUND

In an existing mobile communication system, an operator provides a Subscriber Identity Module (SIM) card for a user, and a cellular system uses the SIM card provided by the operator for identity authentication. A user need to apply to different operators for SIM cards respectively in order to use services provided by the operators. Moreover, when an SIM card is lost or damaged, the user may not access the network of the operator and thus may not use the service.

In addition, since a phone number may be used by only one terminal device at the same time, when a user wants to replace his/her terminal device, the SIM card has to be transferred to the substitute at the same time. However, at present, different terminal devices have different specification requirements on SIM cards. Therefore, when replacing the terminal device, the user may have to go to the operator to replace the SIM card or use an adapter. This may bring inconvenience to the user, cause high overhead of the user and even damage the SIM card or the terminal device due to failure of the adapter.

In view of the above, the existing manner makes many limits to a user's usage of a service of an operator, brings great inconvenience to the user and may even cause high overhead of the user.

SUMMARY

The embodiments of the disclosure provide a user identity authentication method, which may implement a unified security identity authentication manner, improve usability and implement optimal utilization of resources.

A first aspect provides a user identity authentication method, which may include that: a Service Provider (SP) device receives a user request sent by a terminal, the user request including an identity credential of a user; the SP device determines an Identifier (ID) of the user and a priority of the identity credential according to the user request; and the SP device enables a corresponding service for the terminal according to the priority.

A second aspect provides a user identity authentication method, which may include that: an identity authentication server acquires a user request from an SP device, the user request including an identity credential of a user; the identity authentication server determines an ID of the user and a priority of the identity credential according to the user request; and the identity authentication server sends the ID of the user and the priority of the identity credential to the SP device for enabling corresponding service for the user.

A third aspect provides a user identity authentication method, which may include that: a terminal receives an identity credential input by a user; the terminal determines an ID of the user and a priority of the identity credential according to the identity credential; the terminal acquires subscription information of the user according to the ID of the user; and the terminal determines service corresponding to the priority of the identity credential according to the subscription information.

A fourth aspect provides a terminal, which may include: a receiving unit, configured to receive an identity credential input by a user; a determination unit, configured to determine an ID of the user and a priority of the identity credential according to the identity credential; and an acquisition unit, configured to acquire subscription information of the user according to the ID of the user, wherein the determination unit is further configured to determine a service corresponding to the priority of the identity credential according to the subscription information.

A fifth aspect provides an SP device, which may include: a receiving unit, configured to receive a user request sent by a terminal, the user request including an identity credential of a user; a determination unit, configured to determine an ID of the user and a priority of the identity credential according to the user request; and a processing unit, configured to enable a corresponding service for the terminal according to the priority.

A sixth aspect provides device for user identity authentication, which may include: a receiving unit, configured to acquire a user request from an SP device, the user request including an identity credential of a user; a determination unit, configured to determine an ID of the user and a priority of the identity credential according to the user request; and a sending unit, configured to send the ID of the user and the priority of the identity credential to the SP device for enabling a corresponding service for the user.

In the embodiments of the disclosure, according to the identity credential of the user, the SP device provides the corresponding service. In such a manner, a unified security identity authentication manner may be implemented, usability is improved, and optimal utilization of resources may also be implemented.

BRIEF DESCRIPTION OF DRAWINGS

In order to describe the technical solutions of the embodiments of the disclosure more clearly, the drawings required to be used for descriptions about the embodiments or a conventional art will be simply introduced below. Obviously, the drawings described below are only some embodiments of the disclosure. For those skilled in the art, other drawings may further be obtained according to these drawings without creative work.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those skilled in the art on the basis of the embodiments in the disclosure without creative work fall within the scope of protection of the disclosure.

It is to be noted that, in the embodiments of the disclosure, a terminal may also be called a User Equipment (UE), including, but not limited to, a device with a wireless communication function. For example, the terminal may be a device capable of using a communication service, such as a handheld terminal, a vehicle-mounted device, a wearable device, a home intelligent device and a sensor, and for example, may be a cellular phone like an intelligent mobile phone.

In the embodiments of the disclosure, an operator may provide a service for a user through an SP device, and the provided service includes, but not limited to: conventional communication services such as voice, video and data, and services which may emerge in the future such as Internet of vehicles, Internet of things, intelligent transportation, smart home, medical monitoring and sensor networks.

Figure 1:
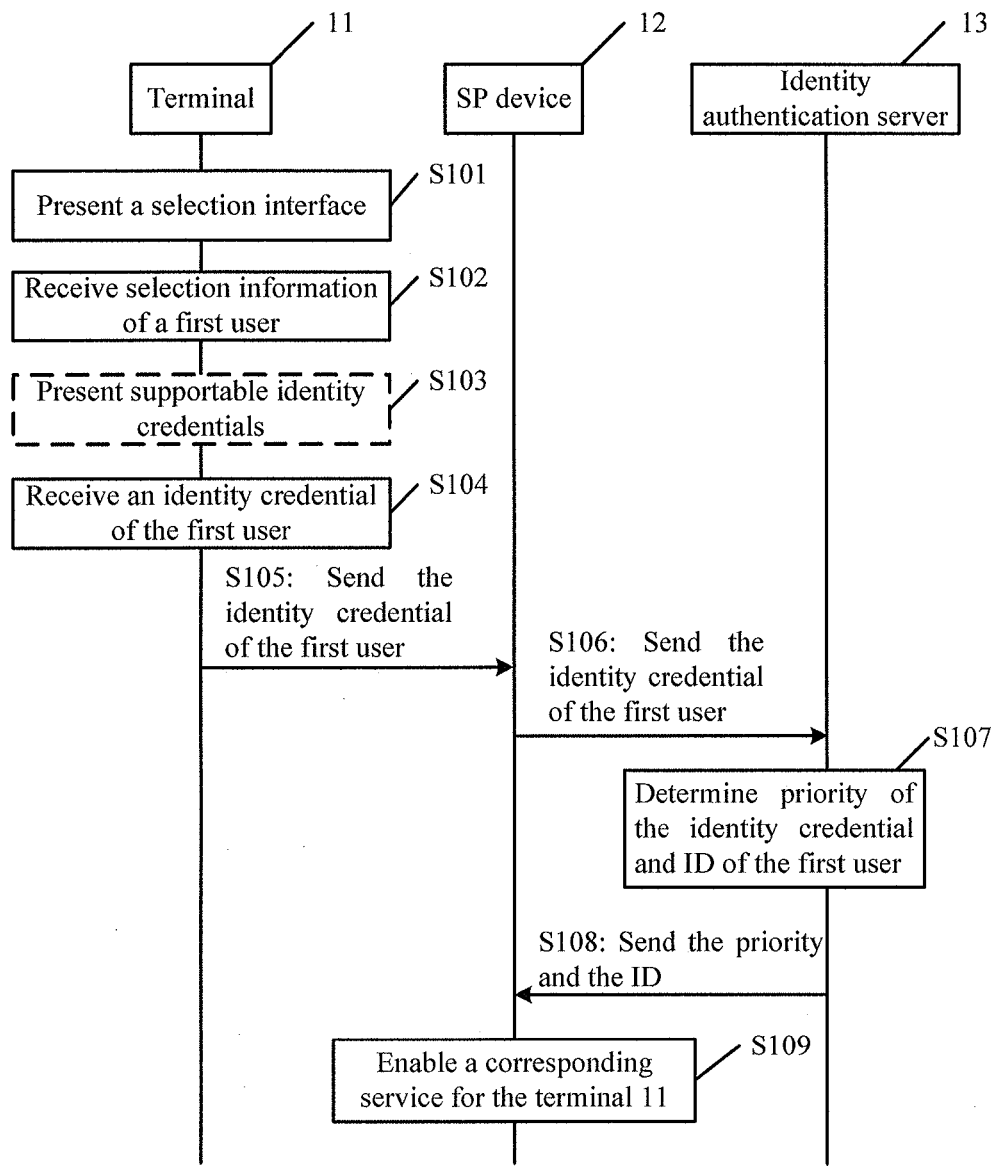
FIG. 1 illustrates a flowchart of a user identity authentication method according to an embodiment of the disclosure.

FIG. 1 illustrates a flowchart of a user identity authentication method according to an embodiment of the disclosure. A terminal 11, an SP device 12 and an identity authentication server 13 are illustrated in FIG. 1.

In the embodiment of the disclosure, there is made such a hypothesis that the terminal 11 is not in an operation state initially, that is, no user uses the terminal 11 to access a mobile network. Or, the terminal 11 is in a factory set state, or a first user uses the terminal 11 for the first time.

In S101, when the first user plans to use the terminal 11, the terminal presents a selection interface configured for the first user to select an operator.

Figure 2:
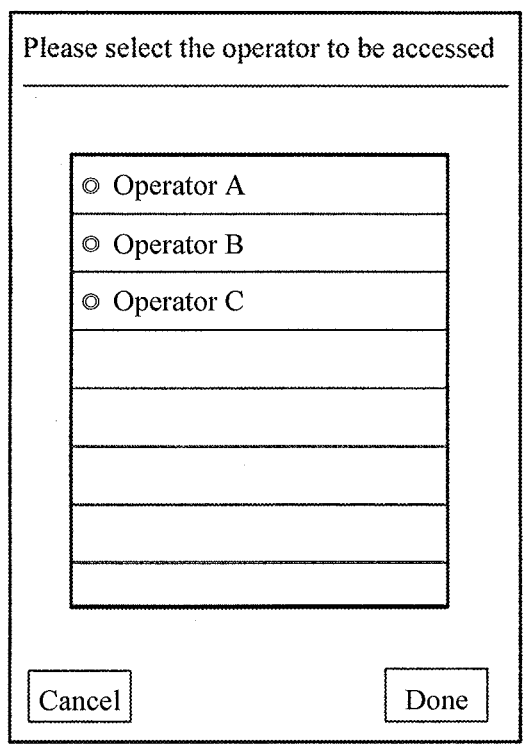
FIG. 2 illustrates a schematic diagram of a selection interface presented by a terminal according to an embodiment of the disclosure.

For example, the interface of the terminal 11 may display a first list (one example is illustrated in FIG. 2), and multiple operators are listed in the first list (an operator A, an operator B and an operator C are illustrated in FIG. 2).

In S102, the terminal 11 receives selection information input by the first user, the selection information indicating the operator selected by the first user.

Specifically, the first user may select at least one operator from the selection interface presented in S101.

For example, the selection information may be that the first user selects the operator A illustrated in FIG. 2 and clicks a "Done" button.

For example, the selection information may also be that the first user selects the operator A and the operator C illustrated in FIG. 2 and clicks the "Done" button.

In S103, the terminal 11 presents a supportable identity credential list.

In the embodiment of the disclosure, an identity credential is a characteristic of an identity of a user. The identity credential may include a primary credential and a secondary credential. The primary credential may include at least one of: a DeoxyriboNucleic Acid (DNA), a fingerprint, an iris, a voiceprint and the like; and the secondary credential may include at least one of: a digital certificate, a digital signature, a user card, a password and the like. Moreover, the identity credential may implement identity binding authentication with another certificate. The another certificate may be, for example, a certificate issued by an authority. For example, the certificate issued by the authority may be an identity card number or a passport number. In the embodiment of the disclosure, the other certificate may be determined as an ID of the first user.

In the embodiment of the disclosure, different identity credentials may have different priorities. A priority of a primary credential is higher than a priority of a secondary credential. Moreover, specifically, the DNA may be determined to have a highest priority, the fingerprint has a second priority, the iris has a third priority, the voiceprint has a fourth priority, . . . , and the password has a lowest priority.

Here, the DNA may be determined by collecting blood, saliva or the like. The fingerprint may be fingerprint information of multiple fingers or fingerprint information of one finger, or may be part of fingerprint information of a finger. Moreover, a priority of fingers of multiple fingers may be higher than a priority of a fingerprint of one finger. The iris may be irises of double eyes or a single eye.

For example, the user card may be a SIM card. The password may be a long character string or a short character string, or may be a sequence of motions on a figure.

It is to understood that, due to differences in hardware among different terminals, different user credentials may be supported to be input. For example, some terminals may acquire iris information of users through cameras, and some terminals may acquire fingerprint information of users through specific regions. Some terminal will also collect blood, salvia or the like for DNA recognition in a specific manner in the future.

Therefore, the user credential list presented by the terminal 11 in S103 is related to a hardware attribute and the like of the terminal 11.

It is to be noted that, in the embodiment of the disclosure, Step S103 is not necessary but optional. For example, the terminal 11 is owned by the first user, and may be used by another user only after agreement or authorization of the first user. Moreover, the first user has been quite familiar with an attribute (and a corresponding service) of the terminal 11, so that the first user may set the terminal 11 to no longer present the supported identity credential list.

In S104, the terminal 11 receives an identity credential input by the first user.

For example, the first user may input a password through a keyboard or touch screen of the terminal 11. Or, the first terminal may input a fingerprint through a fingerprint acquisition module of the terminal 11. Or, the first terminal may input an iris through a camera of the terminal 11. Or, the first terminal may input a voiceprint through a microphone, etc.

In the embodiment of the disclosure, the terminal 11 is not limited to be used by one user, that is, multiple users may access the mobile network through the terminal 11. Then, the terminal 11 may allocate independent storage regions for different users. For example, there may be multiple physically or logically independent storage regions in the terminal 11, configured to store information of different users respectively.

Specifically, the terminal 11 may allocate a first storage region for the first user to store the identity credential of the first user and, after authentication succeeds, store user data (including a User Interface (UI)) of the first user, service information and the like.

In S105, the terminal 11 sends the identity credential of the first user to the SP device 12.

It is to be understood that the SP device 12 is an SP device of the operator selected by the first user in S102.

For example, if the operator selected by the first user in S102 is the operator A, the SP device 12 is an SP device of the operator A. For example, if the operators selected by the first user in S102 are the operator A and the operator B, the SP device 12 includes an SP device of the operator A and an SP device of the operator B.

Alternatively, if a priority of the identity credential of the first user is relatively high, for example, the DNA or the iris, the terminal 11 may process the identity credential of the first user by adopting a generation method, and then sends the processed identity credential to the SP device 12. That is, the terminal 11 does not directly transmit original data of the identity credential such as the DNA, fingerprint, iris and voiceprint of the user, and instead, transmits data generated by processing with a certain generation method (for example, a certain one-way mapping algorithm is used). Therefore, the user may protect privacy information from being illegally acquired by the operator or a third party (for example, a hacker) intercepting the transmitted data.

Here, the generation method may be understood as an encryption method. Moreover, a low-priority form may be generated after the generation method is adopted. For example, for the DNA, a character string with a length of 30 may be generated by processing with the generation method. For the fingerprint, a character string with a length of 25 may be generated by processing with the generation method.

In S106, the SP device 12 sends the identity credential of the first user to the identity authentication server 13.

Alternatively, as an example, the identity authentication server 13 may be constructed and maintained by an SP (for example, the operator). That is, different operators construct and maintain respective identity authentication servers respectively.

Alternatively, as another example, the identity authentication server 13 may be constructed by a third party other than the user and the operator. For example, the third party may be another third-party organization determined by negotiation. For example, the third party may be a government authority, that is, the identity authentication server 13 may be constructed and maintained by the government authority. Therefore, security of the identity credential of the user can be ensured.

If the identity authentication server 13 is constructed by the third party, the identity authentication server 13 may be accessed by at least one operator. Here, for ensuring security of the identity credential of the user, rights of access of the operators to the identity authentication server 13 may be set.

Alternatively, in S106, the SP device 12 may reprocess the identity credential of the first user for sending to the identity authentication server 13, for example, addition of own digital signature or encryption. Therefore, not only may a source of a message be indicated to the identity authentication server 13, but also security communication between the SP device 12 and the identity authentication server 13 can be ensured. It is to understood that the digital signature, encryption method or the like used by the SP device 12 is predetermined by the SP device 12 and the identity authentication server 13.

It is to be understood that, if the SP device 12 receives the identity credential generated by processing with the generation method from the terminal 11 in S105, the SP device 12 may also send the identity credential generated by processing with the generation method to the identity authentication server 13 in S106. Or, in S106, the SP device may reprocess (own digital signature addition or encryption) the identity credential generated by processing with the generation method for sending to the identity authentication server 13. The SP device 12 does not know the generation method adopted by the terminal 11, or, the SP device 12 does not know an encryption key though knowing the generation method, so that the SP device 12 cannot perform a decryption operation, and the SP device 12 cannot acquire the high-priority identity credential of the first user. Therefore, security of the identity credential can be improved.

For example, the identity credential input into the terminal 11 by the first user is DNA characteristic information, and the processed identity credential acquired by the SP device 12 from the terminal 11 is a character string with a length of 30. Correspondingly, the SP device 12 sends the character string with the length of 30 to the identity authentication server 13, or the SP device 12 reprocesses the character string with the length of 30 for sending to the identity authentication server 13.

In S107, the identity authentication server 13 determines an ID, corresponding to the identity credential, of the first user and a priority of the identity credential according to the identity credential of the first user.

Herein, the ID of the first user may be a certificate issued by the authority, for example, may be an identity card number or passport number of the first user.

In the embodiment of the disclosure, a corresponding relationship among an ID of a user, an identity credential of the user and a priority of the identity credential is stored in the identity authentication server 13. That is, information of identity binding authentication between the identity credential and the other certificate is stored in the identity authentication server 13.

For example, as illustrated in Table 1, if the identity credential received by the identity authentication server 13 in S106 is DNA1, the identity authentication server 13 may determine that a corresponding ID is ID1 and a corresponding priority is P1.

TABLE 1

| Priority | P1 | P2 | P3 | P4 | . . . | P9 |
|---|---|---|---|---|---|---|
| ID1 | DNA1 | Fingerprint 1 | Iris 1 | Voiceprint 1 | | Password |

If the identity authentication server 13 receives the processed identity credential (identity credential generated at the terminal 11 by processing with the generation method), in S107, the identity authentication server 13 may firstly recover the identity credential by adopting a verification method and then determine the corresponding priority and ID of the user. It is to be understood that the verification method is a decryption method. Moreover, the SP device 12 cannot acquire the verification method.

It is to be understood that, in the embodiment of the disclosure, the generation method and the verification method are predetermined by the terminal 11 and the identity authentication server 13. For example, the generation method may be included in the factory settings of the terminal 11.

Alternatively, in another embodiment, if the identity authentication server 13 does not receive original data of the identity credential such as the DNA, the fingerprint, the voiceprint and the iris, but receives a sequence obtained by the terminal 11 by processing with the generation method, the identity authentication server 13 may determine the ID of the user and the priority of the identity credential according to the characteristic sequence generated by processing with the generation method. For example, the generation method may also be stored in the identity authentication server 13. The identity authentication server 13 may generate a characteristic sequence for the original data of the DNA, the fingerprint, the voiceprint, the iris and the like by adopting the generation method. Then, the identity authentication server 13 may compare the characteristic sequence with the received sequence, thereby determining the priority of the received identity credential and the ID of the corresponding user.

In addition, in the embodiment of the disclosure, the identity authentication server 13 may acquire the identity credential of the user from a specific part, or, the user may actively upload the identity credential. If the identity authentication server 13 is constructed and maintained by the government authority, the government authority may acquire a corresponding relationship between a fingerprint and identity card number/passport number of a user and the like from the public security department, and may acquire a corresponding relationship between a DNA and iris characteristic information and identity card number/passport number of a user and the like from a specific hospital, and the user may upload the user card, the password and the like.

In S108, the identity authentication server 13 sends the priority of the identity credential and the ID of the first user to the SP device 12.

In such a manner, the SP device 12 may acquire registration information of the user according to the ID of the first user, wherein the registration information may also be called subscription information.

It is to understood that the first user may use a service provided by the operator after being registered with the operator. Before the embodiment of the disclosure, the first user has completed a subscription service in the operator. For example, during subscription, the first user may select at least one kind of service provided by the operator, and may set a user credential required by the at least one kind of service. For example, the first user may select or not select the international roaming service. The first user may make an agreement with the operator on that a user credential required by the international roaming service is a fingerprint.

In S109, the SP device 12 enables a corresponding service for the terminal 11.

A corresponding relationship between a priority of an identity credential and available service is stored in the SP device 12. Herein, the corresponding relationship may also be understood as the subscription information.

For example, the corresponding relationship may include that: the service corresponding to the password includes part of calls; the service corresponding to the user card includes short messages and all the calls; . . . , services corresponding to the fingerprint includes the short messaging service, all the calls and network traffic under a certain threshold value; . . . , the service corresponding to the DNA includes all available service, etc. They will not be listed here one by one.

That is, the user may use the corresponding service only after inputting the corresponding or higher-priority identity credential. If the priority of the identity credential input by the user is lower than the priority of the identity credential corresponding to the service, the terminal 11 may deny the user to use the service.

Specifically, after S108, the SP device 12 may acquire the subscription information of the first user according to the ID of the first user, and furthermore, may determine the service corresponding to the priority of the identity credential according to the subscription information, thereby enabling the corresponding service for the terminal 11 used by the first user in S109.

Specifically, service supported by the operator may be divided into different grades. For example, the grades of the service may be divided according to importance of the service, charges of the service or the like.

The operator may set identity credentials required by service of different grades. For example, the operator may set the following rules: 1, users may modify the service selected when registration by providing a highest-priority identity credential (for example, DNA); and 2, users may use the international roaming call service by providing a second-priority identity credential (for example, fingerprint).

The rules may be represented by the corresponding relationship between the priority of the identity credential and the available service. Moreover, the operator may pre-store the corresponding relationship in the SP device 12. Then, in S109, the SP device 12 may determine the corresponding service according to the corresponding relationship and enable the corresponding service for the terminal 11.

Alternatively, after S108, the SP device 12 may also send the priority of the identity credential and the ID of the first user to the terminal 11 (not illustrated in FIG. 1), and then the terminal 11 may store a corresponding relationship among the identity credential, the priority of the identity credential and the ID of the first user, and specifically, may store it in the first storage region.

After S109, the first user may access the network of the operator through the terminal 11, and may use the service corresponding to the identity credential input by the first user.

It is to be understood that, in such a process, the first user may use the service enabled in S109. If the first user is intended to use a service other than the enabled service, the terminal 11 may display a denial alarm or prompt the first user that a high-priority identity credential is required to be input.

For example, there is made such a hypothesis that the identity credential input by the first user in S104 is a password and the service enabled in S109 includes local call. If the first user is intended to use the international roaming call service, the terminal 11 may present an alarm interface to deny an international roaming call service request of the first user; or, the terminal 11 may present an indication information interface to indicate the first user that the high-priority identity credential "fingerprint" is required to be input to use the service.

Alternatively, as an embodiment, information of priorities of part of user credentials may be prestored in the SP device 12. For example, part of corresponding relationships among IDs of users, identity credentials of the users (part of low-priority user credentials) and priorities of the identity credentials may be prestored.

Then, after S105, the SP device 12 may judge whether the part of corresponding relationships are prestored in the SP device 12 or not at first. If the part of corresponding relationships are not stored on the SP device 12, or, if the SP device 12 may not determine the priority of the identity credential and the ID of the user according to the part of corresponding relationships, S106 is continued to be executed after S105.

If the SP device 12 may determine the priority of the identity credential and the ID of the user according to the part of corresponding relationships, after S105, the SP device 12 may perform authentication according to the part of corresponding relationships, and S109 is directly executed after authentication (that is, S106 to S108 are not required to be executed). Therefore, user authentication efficiency can be improved.

In the embodiment of the disclosure, if the operator where the SP device 12 is located is the operator A, after S109, the first user accesses the network of the operator A through the terminal 11, and may use the service provided by the operator A through the terminal 11.

The process may further include that: the SP device 12 performs charging according to a service usage condition of the first user. Specifically, different charging manners may be adopted for different service types, for example, session based charging, duration based charging, used network resource (for example, traffic) based charging and used resource type based charging. There are no limits made in the disclosure.

Herein, used resource type based charging may include that: charges of priority resources (for example, emergency calls) are relatively high; a charging manner for a resource of a broadcast type is different from a charging manner for a resource of a unicast type; and the like.

Alternatively, the SP device 12 may perform charging through a charging control device, a Policy and Charging Enforcement Function (PCEF), a Policy and Charging Rules Function (PCRF) and the like.

Alternatively, the user may set a charging account corresponding to the ID of the user in a unified charging server, herein the ID of the user corresponds to the charging account one to one. In such a manner, different operators may use the same charging account, so that overhead of the user may be reduced, payment pressure of the user is reduced, and troubles brought by service suspension due to the fact that the user forgets to pay are avoided.

Specifically, the SP device 12 may send a charging request to the unified charging server, the charging request including the ID, and the unified charging server charges the charging account of the user.

Furthermore, in the process, if the first user is intended to use service of another operator (for example, the operator B), at this moment, after the method illustrated in FIG. 1, the following operations (not illustrated in FIG. 1) may further be included.

In S110, the terminal 11 receives a specific instruction of the first user, the specific instruction indicating that an operator is to be reselected.

Specifically, the first user may reselect the operator through a specific button of the terminal 11. For example, the first user may cause the terminal 11 to display an interface illustrated in FIG. 2 through a specific menu of the terminal 11. That is, after S110, S101 and S102 may be executed. There is made such a hypothesis that the operator reselected by the first user in S102 is the operator B.

For example, if a certain service S1 is only provided by the operator B or the service S1 is included only during subscription between the first user and the operator B, after S109, if the first user is intended to use the service S1, the terminal 11 may prompt denial alarm information. At this moment, S110 may be executed, that is, the first user may reselect the operator through the terminal 11.

In the embodiment of the disclosure, after S109, the first user may set operators connected with some service in a "service setting" menu of the terminal 11 in a service usage process. Moreover, such information may be stored in the first storage region of the terminal 11, and then the first user may subsequently use some service by virtue of this setting. For example, the first user may set a sequence of operators used for the service S1 to be: the operator B, the operator A and the operator C. Then, for the service S1, the operator B is used preferably, the operator A is used only when the connection to the operator B is failed (for example, no signal), and the operator C is used only when both the connections to the operator B and the operator A are failed. For example, the first user may set a sequence of operators used for the service S2 to be: the operator A and the operator C.

Thus it can be seen that, in a process of using the terminal 11 by the first user, different services may be provided by different operators. That is, the first user may simultaneously use services provided by multiple operators.

In S111, the terminal 11 sends the identity credential of the first user to an SP device of an operator B.

It is to be understood that the identity credential of the first user is acquired by the terminal 11 in S104, and is stored in the first storage region of the terminal 11. Or, the identity credential of the first user may be reinput by the first user after S110. For example, if the identity credential required by the service S1 only provided by the operator is the DNA, before S111, the first user may input the DNA.

Thereafter, the SP device of the operator B may execute a process similar to the SP device 12, which will not be elaborated herein.

Alternatively, as an example, after the abovementioned method, the following operation may further be included: the terminal 11 receives a temporary quitting instruction of the first user. The temporary quitting instruction indicates that the first user temporarily no longer uses the terminal 11 and the related information of the first user is required to be temporarily suspended. Then, the terminal 11 may suspend the user data of the first user according to the temporary quitting instruction. That is, the user data of the first user is in an inactive state. Herein, the user data may include a profile of the user, an Application (APP) of the user, a UI of the user and the like.

When the first user subsequently desires to continue using the terminal 11, the first user may input an activation instruction. That is, the terminal 11 may receive the activation instruction of the first user and activate the suspended user data of the first user. Specifically, the terminal 11 may load the profile of the first user according to the activated user data and present the UI of the first user. Herein, the UI may present APP information of the first user.

Figure 3:
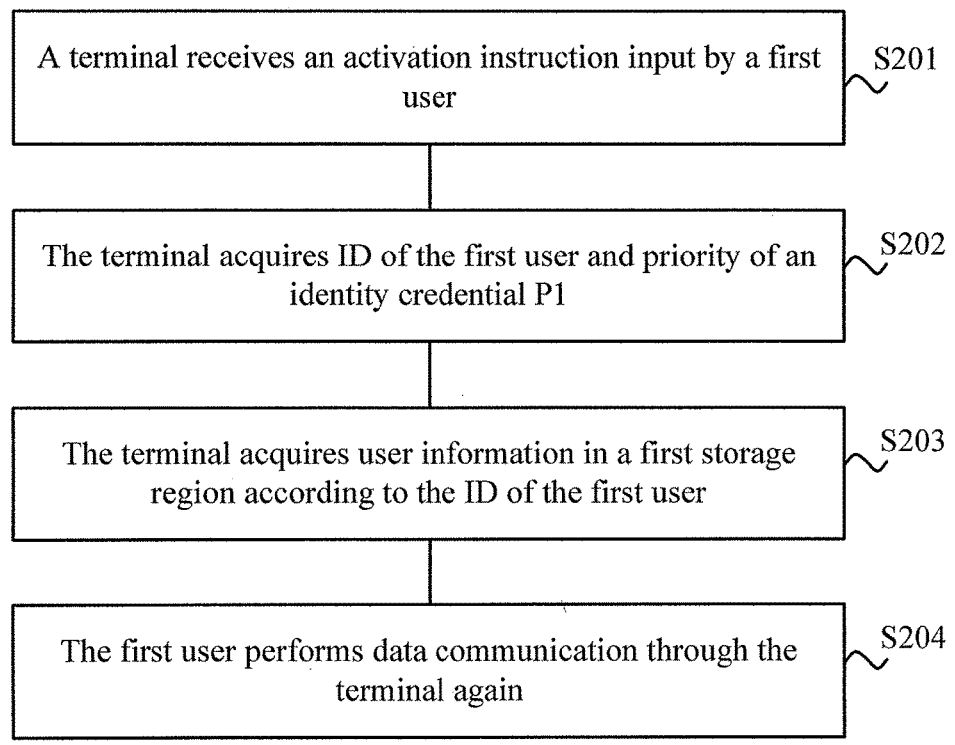
FIG. 3 illustrates a flowchart of a flowchart of a user identity authentication method according to another embodiment of the disclosure.

When the user uses the terminal 11 suspended by the first user through the temporary quitting instruction again, as illustrated in FIG. 3, the following operations may be included.

In S201, a terminal 11 receives an activation instruction input by a first user.

Herein, the activation instruction may be an identity credential of the first user, for example, an identity credential P1.

In S202, the terminal 11 acquires an ID of the first user and a priority of the identity credential P1.

Alternatively, if information of the identity credential P1 of the first user is stored in the terminal 11, in S202, the terminal 11 may determine the ID of the first user and the priority of the input identity credential P1 according to the stored information.

For example, if related information is stored in a first storage region of the terminal 11, the terminal 11 may autonomously determine the ID of the first user and the priority of the input identity credential P1.

Alternatively, if the information of the identity credential P1 of the first user is not stored in the terminal 11 (for example, only information of an identity credential P2 is stored in the terminal 11), the terminal 11 may execute Step S105 and acquire the ID of the first user and the priority of the identity credential P1 from an SP device. Specific descriptions are as mentioned above, and will not be elaborated herein.

In S203, the terminal 11 acquires user information in a first storage region according to the ID of the first user.

Here, the first storage region is, as mentioned above, an independent storage region allocated for the first user by the terminal 11.

Specifically, in S203, the terminal 11 presents a UI, stored in the first storage region, of the first user, and the UI may display an APP of the first user and the like.

In S204, the first user performs data communication again through the terminal 11.

In addition, if the first user sets a sequence of providers (or operators) used for the service through a "service setting" menu after S109, the first user may directly use the service according to settings made before in S204.

Alternatively, there is made such a hypothesis that the first user is intended to use a service S2 and an identity credential required by the service S2 is P2. If the priority of the identity credential P1 input by the first user in S201 is lower than a priority of the identity credential P2, the terminal 11 may deny the first user to use the service S2. Or, the terminal 11 may present a notification message to cause the first user to input the identity credential P2. Or, the terminal 11 may present a selection interface to cause the user to decide whether to send the identity credential P2 stored in the first storage region (if being stored) to an SP device of an operator providing the service S2 or not. There are no limit made in the disclosure.

Alternatively, as another example, after the abovementioned method (after S109 or after S204), the following operation may further be included: the terminal 11 receives a permanent deactivation instruction of the first user. Then, the terminal 11 may delete user data of the first user according to the permanent deactivation instruction. That is, the terminal 11 may delete all the information in the first storage region according to the permanent deactivation instruction.

It is to be understood that, thereafter, if the first user uses the terminal 11 again, a process is the same as the flow when the first user uses the terminal 11 for the first time, and will not be elaborated herein.

For example, if the first user uses a public device in a public place (for example, a library and an internet bar), after use, a permanent deactivation instruction may be input and personal data may be timely cleared, so that security of the user data can be ensured.

It is to be understood that, after the first user temporarily quits or permanently deactivates the terminal 11, another user (for example, a second user) may use the terminal 11 to access a data communication network. Herein, a process of using the terminal 11 by the second user is similar to the process of using the terminal 11 by the first user, and will not be elaborated herein.

Alternatively, in the process of using the terminal 11 by the first user, the second user may also use the terminal 11 in a similar manner. Moreover, the user data of the first user is stored in the first storage region, and user data of the second user is stored in a second storage region. That is, the terminal 11 may be used by multiple users at the same time.

For example, a display screen (for example, a touch screen) of the terminal 11 may be divided into two parts to present a UI of the first user and a UI of the second user respectively. The first user and the second user use the terminal through their respective UIs.

For example, the terminal 11 may present the UI of the first user on the display screen and run the UI of the second user on a background. The first user may use the terminal through the UI, and the second user may use the terminal for communication and the like through Bluetooth.

It is to be noted that, in the embodiment of the disclosure, the terminal 11 may be used by multiple users and user data of the multiple users is stored in respectively independent storage regions in the terminal respectively. That is, user data of different users is stored respectively, and in general, it is impossible for a certain user to access the user data of the other users. However, authorized user data may be accessed by the other users.

For example, the first user may set a right over part of (for example, a user data block DATA1) the user data to be open by authorization, and then the other users may access the authorized user data block DATA1.

For example, the first user may set conditional authorization. For example, a right over part (for example, a user data block DATA2) of the user data is set to be semi-open, and in a setting process, only part of users (for example, a manner of limiting IDs of the users may be adopted) are allowed to access the user data block DATA2. In such a manner, only the users specified by the first user may access the user data block DATA2.

In the embodiment of the disclosure, the operator divides the service provided by itself into different grades, and the user may use the corresponding service by virtue of the corresponding identity credentials. Then, the user may access the network of the operator by virtue of the identity credentials through any available terminal, and flexibility of usage of the corresponding service by the user may be improved.

Figure 4:
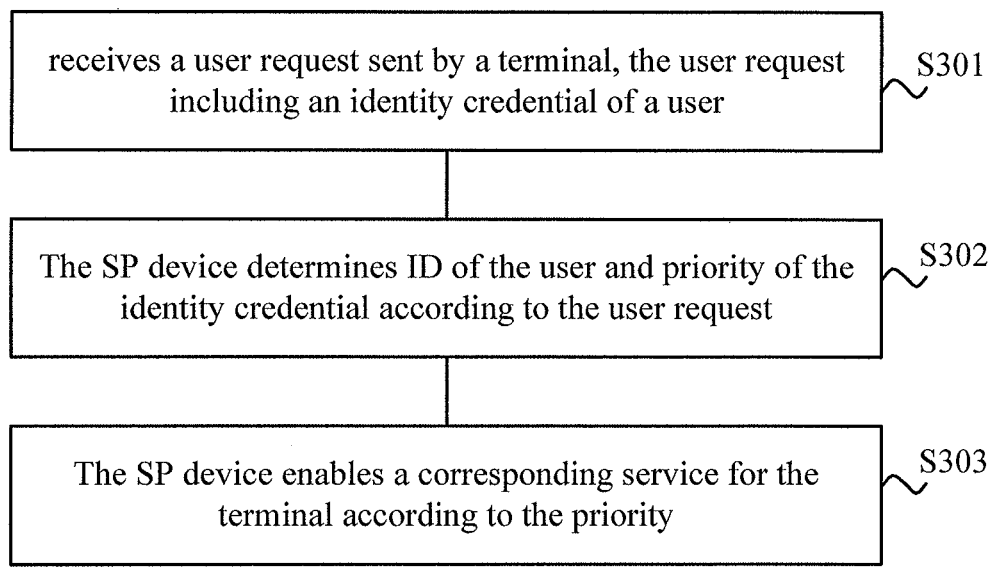
FIG. 4 illustrates a flowchart of a flowchart of a user identity authentication method according to another embodiment of the disclosure.

FIG. 4 illustrates a flowchart of a user identity authentication method according to an embodiment of the disclosure. The method illustrated in FIG. 4 is executed by an SP device, and includes the following operations.

In S301, the SP device receives a user request sent by a terminal, the user request including an identity credential of a user.

In S302, the SP device determines an ID of the user and a priority of the identity credential according to the user request.

In S303, the SP device enables a corresponding service for the terminal according to the priority.

In the embodiment of the disclosure, the SP device provides the corresponding service according to the identity credential of the user. Therefore, a unified security identity authentication manner may be implemented, usability is improved, and optimal utilization of resources may also be implemented.

In the embodiment of the disclosure, the identity credential of the user may include a primary credential and a secondary credential. A priority of the primary credential is higher than a priority of the secondary credential.

Herein, the primary credential includes at least one of: a DNA, a fingerprint, an iris and a voiceprint. Herein, the secondary credential includes at least one of: a digital certificate, a digital signature, a user card and a password.

Moreover, the identity credential may implement identity binding authentication with another certificate. Herein, the other certificate may be, for example, a certificate issued by an authority. For example, the certificate issued by the authority may be an identity card number or a passport number. In the embodiment of the disclosure, the other certificate may be determined as an ID of a first user.

In the embodiment of the disclosure, a priority sequence may be set for various different identity credentials, which may specifically be seen from description about the priorities in the embodiment illustrated in FIG. 1 and will not be elaborated herein.

Alternatively, in S302, the SP device may determine the ID and the priority corresponding to the identity credential according to a prestored corresponding relationship.

Alternatively, as another embodiment, in S302, the SP device may send the user request to an identity authentication server and receive the ID and the priority sent by the identity authentication server.

Herein, the identity credential in the user request may be an identity credential generated at the terminal by processing with a generation method.

Alternatively, as an embodiment, in S303, the SP device may determine the service corresponding to the priority, wherein different priorities correspond to different services, and a service corresponding to a high priority includes a service corresponding to low priority; and the service corresponding to the priority is enabled for the terminal.

It is to be understood that a corresponding relationship between a priority and a service may be stored in the SP device. Specifically, S303 may be seen from the description about S109 in the embodiment illustrated in FIG. 1, and will not be elaborated for avoiding repetition.

Furthermore, after S303, the SP device may perform charging according to a service usage condition of the user.

Specifically, the SP device may send a charging request to a unified charging server to enable the unified charging server to charge a charging account of the user. Herein, the charging request includes the ID, and the charging account corresponds to the ID one to one.

Here, the charging account may be preset in the unified charging server by the user, and the charging account may be accessed by an SP device of at least one operator.

Figure 5:
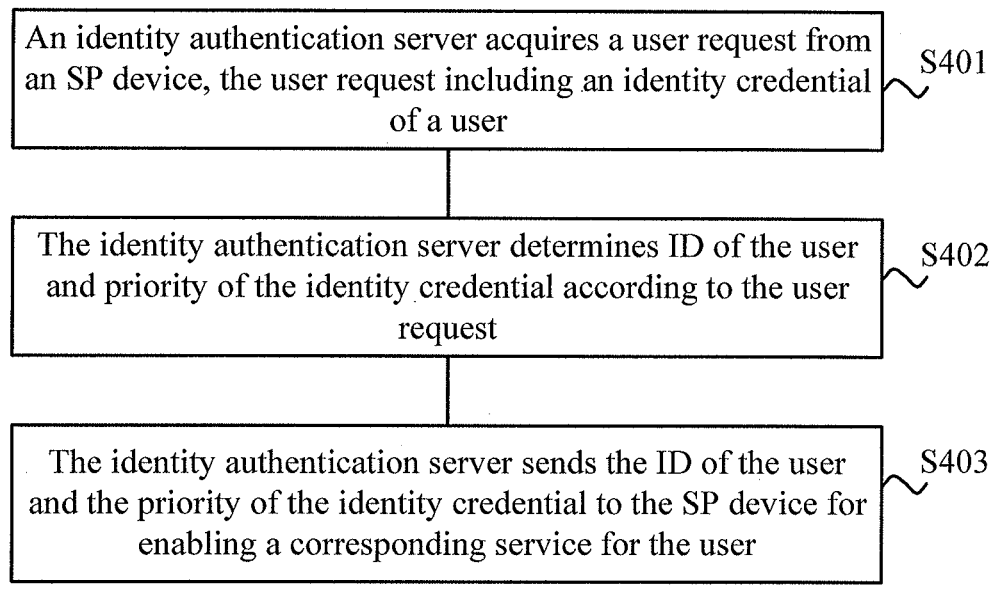
FIG. 5 illustrates a flowchart of a flowchart of a user identity authentication method according to another embodiment of the disclosure.

FIG. 5 illustrates a flowchart of a user identity authentication method according to another embodiment of the disclosure. The method illustrated in FIG. 5 is executed by an identity authentication server, and includes the following operations.

In S401, the identity authentication server acquires a user request from an SP device, the user request including an identity credential of a user.

In S402, the identity authentication server determines an ID of the user and a priority of the identity credential according to the user request.

In S403, the identity authentication server sends the ID of the user and the priority of the identity credential to the SP device for enabling a corresponding service for the user.

In the embodiment of the disclosure, the identity authentication server acquires the identity credential of the user from the SP device, and sends the ID, corresponding to the identity credential, of the user and the priority of the identity credential to the SP device. Therefore, a unified security identity authentication manner may be implemented, usability is improved, and optimal utilization of resources may also be implemented.

In the embodiment of the disclosure, the identity credential of the user may include a primary credential and a secondary credential. A priority of the primary credential is higher than a priority of the secondary credential.

Herein, the primary credential includes at least one of: a DNA, a fingerprint, an iris and a voiceprint. Herein, the secondary credential includes at least one of: a digital certificate, a digital signature, a user card and a password.

Moreover, the identity credential may implement identity binding authentication with another certificate. Herein, the another certificate may be, for example, a certificate issued by an authority. For example, the certificate issued by the authority may be an identity card number or a passport number. In the embodiment of the disclosure, the another certificate may be determined as an ID of a first user.

In the embodiment of the disclosure, a priority sequence may be set for various different identity credentials, which may specifically be seen from description about the priorities in the embodiment illustrated in FIG. 1 and will not be elaborated herein.

The identity authentication server may be constructed and maintained by an operator, or may be constructed and maintained by a third-party organization determined by negotiation. Herein, the third party may be, for example, a government authority.

In the embodiment of the disclosure, in S401, the identity credential in the user request may be an identity credential generated at the terminal by processing with a generation method. Correspondingly, S402 may include that: the identity credential is processed by adopting a verification method; and the ID and the priority corresponding to the processed identity credential are acquired according to a prestored corresponding relationship.

Herein, the prestored corresponding relationship may be acquired from a specific department by the identity authentication server, or, the prestored corresponding relationship may be uploaded by the user, and there is no limit made in the disclosure.

It is to be understood that S401 may be seen from the descriptions about S106 in the embodiment illustrated in FIG. 1, S402 may be seen from the description about S107 in the embodiment illustrated in FIG. 1, S403 may be seen from the description about S108 in the embodiment illustrated in FIG. 1, and they will not be elaborated herein for avoiding repetition.

Figure 6:
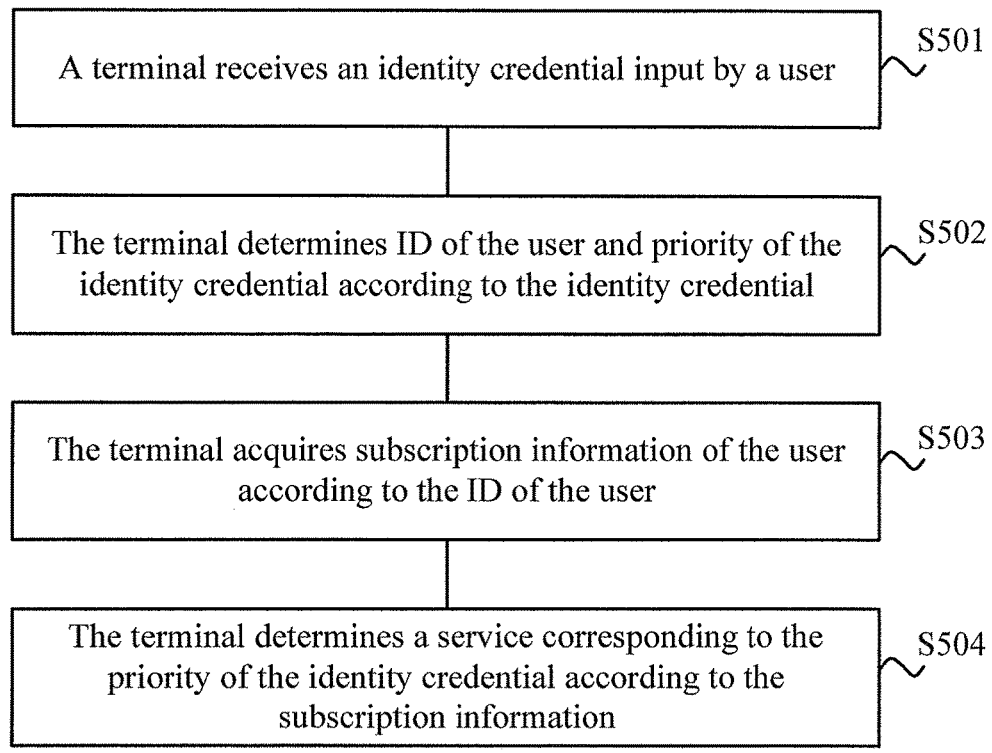
FIG. 6 illustrates a flowchart of a flowchart of a user identity authentication method according to another embodiment of the disclosure.
Figure 7:
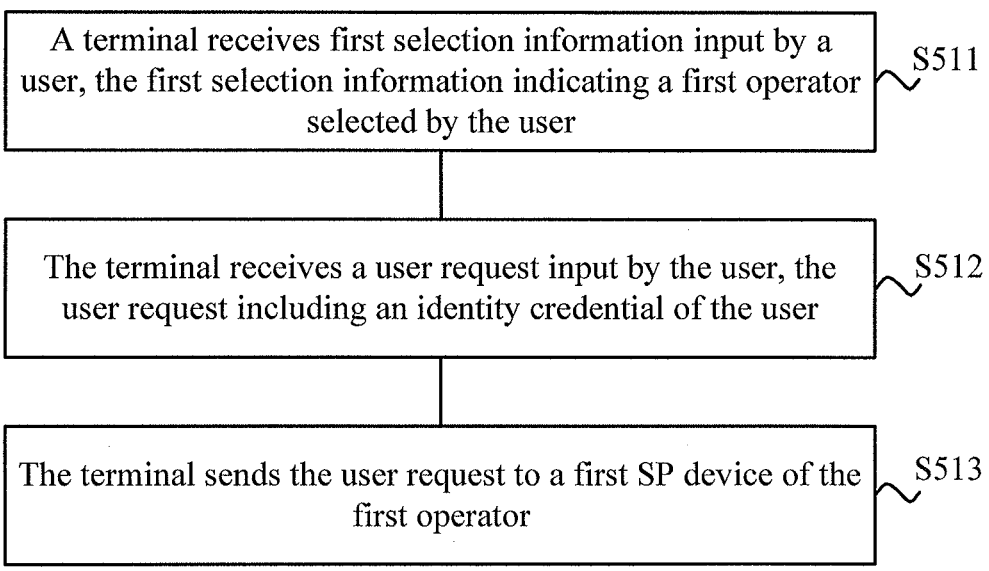
FIG. 7 illustrates a flowchart of a flowchart of a user identity authentication method according to another embodiment of the disclosure.

FIG. 6 illustrates a flowchart of a user identity authentication method according to another embodiment of the disclosure. The method illustrated in FIG. 6 is executed by a terminal, and includes the following operations.

In S501, the terminal receives an identity credential input by a user.

In S502, the terminal determines an ID of the user and a priority of the identity credential according to the identity credential.

In S503, the terminal acquires subscription information of the user according to the ID of the user.

In S504, the terminal determines a service corresponding to the priority of the identity credential according to the subscription information.

In the embodiment of the disclosure, the terminal determines the ID of the user according to the identity credential input by the user, and further, the user may use the service corresponding to the identity credential. Therefore, user experiences may be improved.

In the embodiment of the disclosure, the identity credential may include a primary credential and a secondary credential. A priority of the primary credential is higher than a priority of the secondary credential.

Herein, the primary credential includes at least one of: a DNA, a fingerprint, an iris and a voiceprint. Herein, the secondary credential includes at least one of: a digital certificate, a digital signature, a user card and a password.

Moreover, the identity credential may implement identity binding authentication with another certificate. Herein, the another certificate may be, for example, a certificate issued by an authority. For example, the certificate issued by the authority may be an identity card number or a passport number. In the embodiment of the disclosure, the other certificate may be determined as an ID of a first user.

In the embodiment of the disclosure, a priority sequence may be set for various different identity credentials, which may specifically be seen from description about the priorities in the embodiment illustrated in FIG. 1 and will not be elaborated herein.

It is to be noted that, in the embodiment of the disclosure, S501 may be seen from S201 in the embodiment illustrated in FIG. 3, that is, the identity credential in S501 may be understood as the activation instruction in S201. S502 may be seen from S202 in the embodiment illustrated in FIG. 3, that is, the terminal may execute S202 according to a stored corresponding relationship among an identity credential, an ID of a user and a priority of the identity credential. S503 may be seen from S203 in the embodiment illustrated in FIG. 3, that is, the terminal may acquire the subscription information from the SP device in advance. S504 may be seen from S204 in the embodiment illustrated in FIG. 3, that is, the user may use the service corresponding to the identity credential (supposed to be P1) through the terminal.

Furthermore, if the user is intended to use another service, the following operations may be included: the terminal receives a service request of the user; and if service (supposed to be first service) indicated by the service request is not the service corresponding to the priority of the identity credential, the terminal may deny the service request of the user for the first service. For example, the terminal may present prompting information, the prompting information being configured to indicate the user to input another identity credential corresponding to the first service.

That is, the user may use a corresponding service only after inputting a corresponding identity credential. In general, a service corresponding to an identity credential with a high priority includes a service corresponding to an identity credential with a low priority.

Alternatively, the terminal may be used by at least two users at the same time. The terminal may receive an identity credential (supposed to be P2) input by another user, and furthermore, the terminal may determine another service (supposed to be a second service) corresponding to the identity credential (P2) input by the another user. Then, the another user may use the another service (the second service) through the terminal.

Herein, a process of using the terminal by the another user is similar to the abovementioned process of using the terminal by the user, and will not be elaborated herein.

For example, a display screen (for example, a touch screen) of the terminal may be divided into two parts to present UIs of the two users respectively. The two users use the terminal through their respective UIs.

For example, the terminal may present the UI of one user on the display screen and run the UI of the other user in the background. One user may use the terminal through the UI, and the other user may use the terminal for communication through Bluetooth and the like.

It is to be understood that, before the method illustrated in FIG. 6, the following operations may further be included: the terminal acquires a first corresponding relationship among an identity credential, an ID of a user and a priority of the identity credential; the terminal acquires a second corresponding relationship between an ID of a user and subscription information of the user; and the terminal acquires a third corresponding relationship between a priority of an identity credential and a service.

Figure 8:
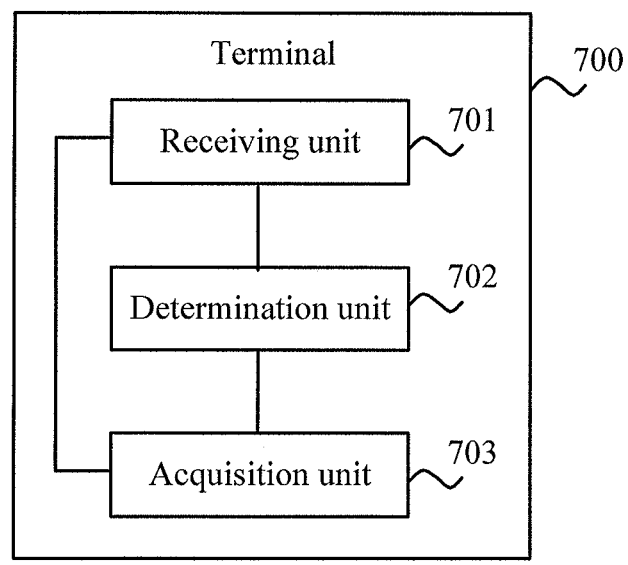
FIG. 8 illustrates a structure block diagram of a terminal according to an embodiment of the disclosure.

Alternatively, before the method illustrated in FIG. 6, the following operations may further be performed, as illustrated in FIG. 8.

In S511, the terminal receives first selection information input by the user, the first selection information indicating a first operator selected by the user.

In S512, the terminal receives a user request input by the user, the user request including the identity credential of the user.

In S513, the terminal sends the user request to a first SP device of the first operator.

In such a manner, the SP device performs identity authentication on the terminal through the identity credential of the user, and the SP device may provide the corresponding service for the user. Therefore, a unified security identity authentication manner may be implemented, usability may be improved, and optimal utilization of resources may also be implemented.

In the embodiment of the disclosure, when the user uses the terminal for the first time (that is, user information of the user is not stored in the terminal), the terminal may allocate an independent storage region for the user, and the independent storage region is configured to store the identity credential of the user and the like.

That is, the terminal may include multiple physically or logically independent storage regions configured to store information of different users respectively.

Alternatively, after S513, the following operation may be performed: when the first SP device indicates that the terminal passes authentication, a network of the first operator is accessed through the first SP device. That is, the user may use the service provided by the first operator through the terminal.

Alternatively, after passing authentication, the terminal may receive the first corresponding relationship sent by the first SP device, the first corresponding relationship including the corresponding relationship among the ID of the user, the identity credential and the priority of the identity credential. Herein, the first corresponding relationship may be stored in the independent storage region allocated for the user.

Alternatively, after passing authentication, the terminal may acquire the subscription information of the user through the first SP device. Herein, the subscription information may be stored in the independent storage region allocated for the user. Here, it is to be understood that the corresponding relationship between the ID of the user and the subscription information is stored.

Alternatively, after passing authentication, the terminal may receive the second corresponding relationship sent by the first SP device, the second corresponding relationship including the corresponding relationship between the priority of the identity credential and the service, wherein the second corresponding relationship may be stored in the independent storage region allocated for the user.

Alternatively, as an embodiment, S513 may include that: the identity credential is processed by adopting a predefined generation method; and the processed identity credential is sent to the first SP device. Description about the generation method may be seen from the related description in the embodiment illustrated in FIG. 1, and will not be elaborated herein.

It is to be understood that S511 may be seen from the descriptions about S102 in the embodiment illustrated in FIG. 1, S512 may be seen from the descriptions about S104 in the embodiment illustrated in FIG. 1, S513 may be seen from the descriptions about S105 in the embodiment illustrated in FIG. 1, and they will not be elaborated herein for avoiding repetition.

Alternatively, as an example, after S513, the operations may further be performed: the terminal receives an instruction of the user, the instruction indicating that the user is to reselect an operator; the terminal receives second selection information of the user, the second selection information indicating a second operator selected by the user; the terminal sends the user request to a second SP device of the second operator; and after the second SP device indicates that the terminal passes authentication, the terminal accesses a network of the second operator through the second SP device. The process may be seen from S110 and S111, and will not be elaborated herein.

That is, in the process of using the terminal by the user, the operators may be switched anytime as desired, or, the user may access networks of multiple operators at the same time, and thus, the user experience may be improved.

Alternatively, as another example, after S513, the following operations may further be performed: the terminal receives a temporary quitting instruction of the user; and the terminal suspends user data of the user according to the temporary quitting instruction.

That is, the user may temporarily suspend a certain terminal. In such a manner, on one hand, security of the user data of the user may be ensured; and on the other hand, another user may use the terminal, so that utilization of the terminal is improved, and optimal utilization of the resources is implemented.

If the terminal subsequently receives an activation instruction of the user, the terminal may activate the suspended user data. Specifically, the terminal may load a profile of the user and present a UI of the user according to the activated user data. Specifically, the activation instruction may be understood as the identity credential in S501 in FIG. 6 herein.

That is, the user may release suspension of the terminal anytime to make it immediately return to service.

Alternatively, as another example, after S503, the following operations may further be performed: the terminal receives a permanent deactivation instruction of the user; and moreover, the terminal deletes the user data of the user according to the permanent deactivation instruction.

In such a manner, if the user just temporarily uses a certain terminal, the data will be permanently deactivated after the temporary use, i.e., the terminal deletes the user data, so that the security of the user data can be ensured.

FIG. 8 illustrates a structure block diagram of a terminal according to an embodiment of the disclosure. The terminal 700 illustrated in FIG. 8 includes a receiving unit 701, a determination unit 702 and an acquisition unit 703.

The receiving unit 701 is configured to receive an identity credential input by a user.

The determination unit 702 is configured to determine an ID of the user and a priority of the identity credential according to the identity credential.

The acquisition unit 703 is configured to acquire subscription information of the user according to the ID of the user.

The determination unit 702 is further configured to determine service corresponding to the priority of the identity credential according to the subscription information.

In the embodiment of the disclosure, the terminal determines the ID of the user according to the identity credential input by the user, and the user may further use the service corresponding to the identity credential. Therefore, a user experience may be improved.

In the embodiment of the disclosure, the identity credential may include a primary credential and a secondary credential. A priority of the primary credential is higher than a priority of the secondary credential.

Herein the primary credential includes at least one of: a DNA, a fingerprint, an iris and a voiceprint. Herein the secondary credential includes at least one of: a digital certificate, a digital signature, a user card and a password.

Moreover, the identity credential may implement identity binding authentication with another certificate, wherein the other certificate may be, for example, a certificate issued by an authority. For example, the certificate issued by the authority may be an identity card number or a passport number. In the embodiment of the disclosure, the other certificate may be determined as an ID of a first user.

In the embodiment of the disclosure, a priority sequence may be set for various different identity credentials, which may specifically refer to descriptions about the priorities in the embodiment illustrated in FIG. 1 and will not be elaborated herein.

In the embodiment of the disclosure, the terminal 700 may further include a sending unit and a processing unit.

Alternatively, as an embodiment, the receiving unit 701 may further be configured to receive first selection information input by the user, the first selection information indicating a first operator selected by the user. The receiving unit 701 may further be configured to receive a user request input by the user, the user request including the identity credential. The sending unit may be configured to send the user request to a first SP device of the first operator.

Alternatively, as another embodiment, the processing unit may be configured to: after the first SP device indicates that the identity credential passes authentication, access a network of the first operator through the first SP device.

Alternatively, as another embodiment, the receiving unit 701 may further be configured to: acquire the subscription information of the user through the first SP device.

Alternatively, as another embodiment, the receiving unit 701 may further be configured to: receive a first corresponding relationship sent by the first SP device, the first corresponding relationship including a corresponding relationship among an ID of a user, an identity credential and a priority of the identity credential.

Alternatively, as another embodiment, the receiving unit 701 may further be configured to: receive a second corresponding relationship sent by the first SP device, the second corresponding relationship including a corresponding relationship between a priority of an identity credential and service.

Alternatively, as another embodiment, the sending unit may specifically be configured to: process the identity credential by adopting a predefined generation method; and send the processed identity credential to the first SP device.

Alternatively, as another embodiment, the receiving unit 701 may further be configured to receive an instruction of the user, the instruction indicating that the user is required to reselect an operator, and may further be configured to receive second selection information of the user, the second selection information indicating a second operator selected by the user. The sending unit may further be configured to send the user request to a second SP device of the second operator. The processing unit may further be configured to, after the second SP device indicates that the terminal passes authentication, access a network of the second operator through the second SP device.

Alternatively, as another embodiment, the processing unit may further be configured to allocate an independent storage region for the user, the independent storage region being configured to store the identity credential of the user.

Alternatively, as another embodiment, the receiving unit 701 may further be configured to receive a temporary quitting instruction of the user. The processing unit may further be configured to suspend user data of the user according to the temporary quitting instruction.

Alternatively, as another embodiment, the processing unit may further be configured to: load a profile of the user and present a UI of the user according to the identity credential.

Alternatively, as another embodiment, the receiving unit 701 may further be configured to: receive a service request of the user. The processing unit may be configured to, if service indicated by the service request is not the service corresponding to the priority of the identity credential, deny the service request.

Alternatively, as another embodiment, the processing unit is specifically configured to: present prompting information, the prompting information being configured to indicate the user to input another identity credential corresponding to the service indicated by the service request.

Alternatively, as another embodiment, the receiving unit 701 may further be configured to: receive a user credential input by another user. The determination unit 702 may further be configured to determine another piece of service corresponding to the identity credential input by the other user to enable the other user to use the other service through the terminal.

Alternatively, as another embodiment, the receiving unit 701 may further be configured to: receive a permanent deactivation instruction of the user. The processing unit may further be configured to delete the user data of the user according to the permanent deactivation instruction.

Figure 9:
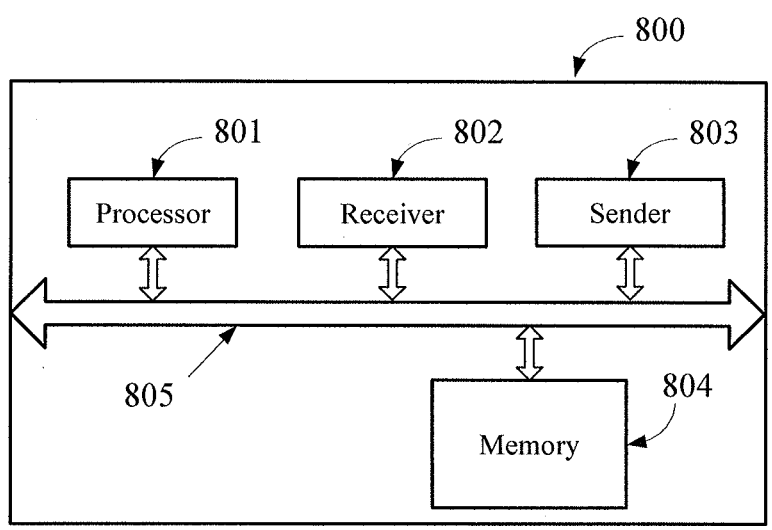
FIG. 9 illustrates a structure block diagram of a terminal according to another embodiment of the disclosure.

It is to be noted that, in the embodiment of the disclosure, the receiving unit 701 may be implemented by a receiver, the sending unit may be implemented by a sender, and the determination unit 702, the acquisition unit 703 and the processing unit may be implemented by a processor. As illustrated in FIG. 9, a terminal 800 may include a processor 801, a receiver 802, a sender 802 and a memory 804, wherein the memory 804 may be configured to store user information, and may further be configured to store codes executed by the processor 801 and the like.

Specifically, a logical storage region in the memory 804 may be configured to store the user information, including an identity credential, subscription information, UI and the like of a user.

Each component in the terminal 800 is coupled together through a bus system 805, wherein the bus system 805 includes a data bus, and further includes a power bus, a control bus and a state signal bus.

The terminal 700 illustrated in FIG. 8 or the terminal 800 illustrated in FIG. 9 may implement each process implemented in the terminal in the embodiments illustrated in FIG. 1 and FIG. 3 to FIG. 7, which will not be elaborated herein to avoid repetition.

It is to be noted that the method embodiments of the disclosure may be applied to a processor or implemented by the processor. The processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It is to be understood that the memory in the embodiment of the disclosure may be a volatile memory or a nonvolatile memory, or may include both the volatile and nonvolatile memories, wherein the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 10:
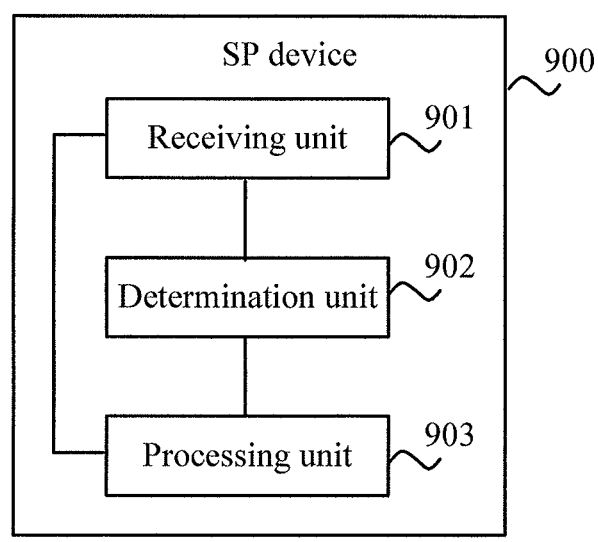
FIG. 10 illustrates a structure block diagram of an SP device according to an embodiment of the disclosure.

FIG. 10 illustrates a structure block diagram of an SP device according to an embodiment of the disclosure. The SP device 900 illustrated in FIG. 10 includes a receiving unit 901, a determination unit 902 and a processing unit 903.

The receiving unit 901 is configured to receive a user request sent by a terminal, the user request including an identity credential of a user.

The determination unit 902 is configured to determine an ID of the user and a priority of the identity credential according to the user request.

The processing unit 903 is configured to enable a corresponding service for the terminal according to the priority.

In the embodiment of the disclosure, the SP device provides the corresponding service according to the identity credential of the user. Therefore, a unified security identity authentication manner may be implemented, usability is improved, and optimal utilization of resources may also be implemented.

In the embodiment of the disclosure, the identity credential of the user may include a primary credential and a secondary credential. A priority of the primary credential is higher than a priority of the secondary credential.

Herein the primary credential includes at least one of: a DNA, a fingerprint, an iris and a voiceprint. Herein the secondary credential includes at least one of: a digital certificate, a digital signature, a user card and a password.

Moreover, the identity credential may implement identity binding authentication with another certificate. Herein, the other certificate may be, for example, a certificate issued by an authority. For example, the certificate issued by the authority may be an identity card number or a passport number. In the embodiment of the disclosure, the other certificate may be determined as an ID of a first user.

In the embodiment of the disclosure, a priority sequence may be set for various different identity credentials, which may specifically refer to descriptions about the priorities in the embodiment illustrated in FIG. 1 and will not be elaborated herein.

In the embodiment of the disclosure, the SP device 900 may further include a sending unit.

Alternatively, as an embodiment, the determination unit 902 may specifically be configured to: determine the ID and priority corresponding to the identity credential according to a prestored corresponding relationship.

Alternatively, as another embodiment, the determination unit 902 may specifically be configured to: send the user request to an identity authentication server and receive the ID and priority sent by the identity authentication server.

Alternatively, as another embodiment, the processing unit 903 may specifically be configured to: determine the service corresponding to the priority. Herein, different priorities correspond to different service, and service corresponding to high priorities includes service corresponding to low priorities; and enable the service corresponding to the priority for the terminal.

Alternatively, as another embodiment, the processing unit 903 may further be configured to: perform charging according to a service usage condition of the user.

Alternatively, as another embodiment, the sending unit may be configured to: send a charging request to a unified charging server to enable the unified charging server to charge a charging account of the user. Herein, the charging request includes the ID, and the charging account corresponds to the ID one to one.

Figure 11:
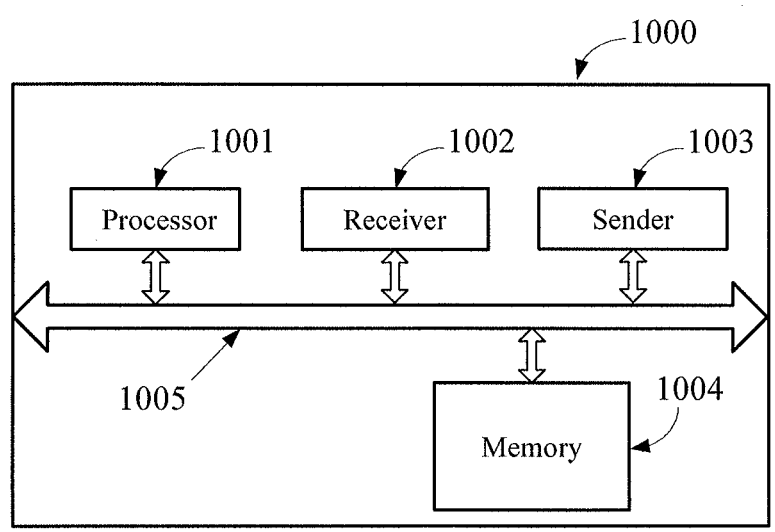
FIG. 11 illustrates a structure block diagram of an SP device according to another embodiment of the disclosure.

It is to be noted that, in the embodiment of the disclosure, the receiving unit 901 may be implemented by a receiver, the sending unit may be implemented by a sender, and the determination unit 902 and the processing unit 903 may be implemented by a processor. As illustrated in FIG. 11, an SP device 1000 may include a processor 1001, a receiver 1002, a sender 1002 and a memory 1004. Herein, the memory 1004 may be configured to store subscription information of a user, and may further be configured to store codes executed by the processor 1001 and the like.

Each component in the SP device 1000 is coupled together through a bus system 1005 including a data bus, and further includes a power bus, a control bus and a state signal bus.

The SP device 900 illustrated in FIG. 10 or the SP device 1000 illustrated in FIG. 11 may implement each process implemented in the SP device in the embodiments illustrated in FIG. 1 and FIG. 3 to FIG. 7, which will not be elaborated herein to avoid repetition.

Figure 12:
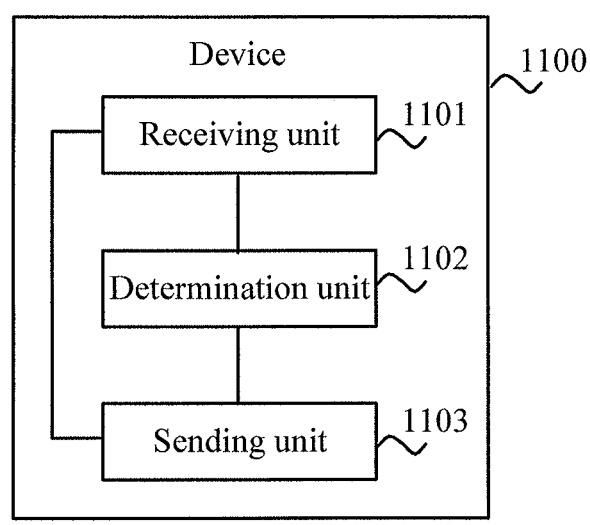
FIG. 12 illustrates a structure block diagram of device for user identity authentication according to an embodiment of the disclosure.

FIG. 12 illustrates a structure block diagram of device for user identity authentication according to an embodiment of the disclosure. The device 1100 illustrated in FIG. 12 includes: a receiving unit 1101, a determination unit 1102 and a sending unit 1103.

The receiving unit 1101 is configured to acquire a user request from an SP device, the user request including an identity credential of a user.

The determination unit 1102 is configured to determine an ID of the user and a priority of the identity credential according to the user request.

The sending unit 1103 is configured to send the ID of the user and the priority of the identity credential to the SP device for enabling a corresponding service for the user.

In the embodiment of the disclosure, an identity authentication server acquires the identity credential of the user from the SP device, and sends the ID, corresponding to the identity credential, of the user and the priority of the identity credential to the SP device. Therefore, a unified security identity authentication manner may be implemented, usability is improved, and optimal utilization of resources may also be implemented.

In the embodiment of the disclosure, the identity credential of the user may include a primary credential and a secondary credential. A priority of the primary credential is higher than a priority of the secondary credential.

Herein the primary credential includes at least one of: a DNA, a fingerprint, an iris and a voiceprint. Herein the secondary credential includes at least one of: a digital certificate, a digital signature, a user card and a password.

Moreover, the identity credential may implement identity binding authentication with another certificate. Herein, the another certificate may be, for example, a certificate issued by an authority. For example, the certificate issued by the authority may be an identity card number or a passport number. In the embodiment of the disclosure, the other certificate may be determined as an ID of a first user.

In the embodiment of the disclosure, a priority sequence may be set for various different identity credentials, which may specifically refer to descriptions about the priorities in the embodiment illustrated in FIG. 1 and will not be elaborated herein.

The device 1100 in the embodiment of the disclosure may be the identity authentication server.

Alternatively, as an embodiment, the identity credential is generated by a terminal by processing with a generation method. The determination unit 1102 may specifically be configured to: process the identity credential by adopting a verification method; and acquire the ID and priority corresponding to the processed identity credential according to a prestored corresponding relationship.

Alternatively, as another embodiment, the prestored corresponding relationship is uploaded by the user.

Alternatively, as another embodiment, the device is constructed and maintained by a government authority, or, the device is constructed and maintained by an operator.

Figure 13:
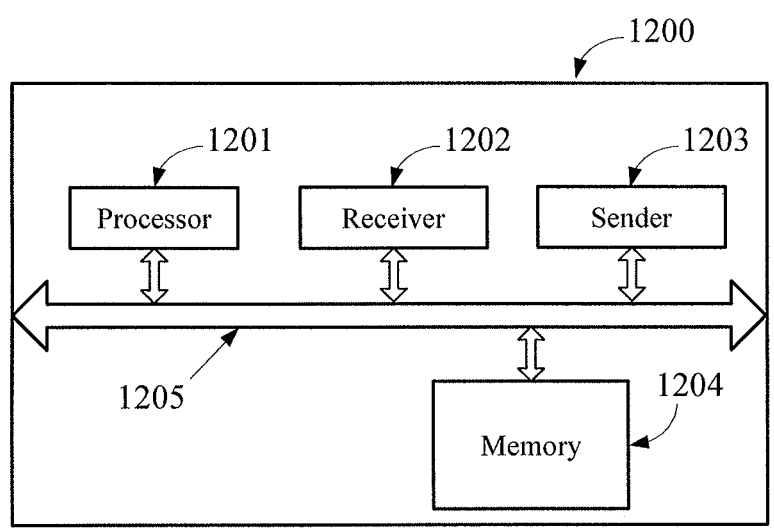
FIG. 13 illustrates a structure block diagram of device for user identity authentication according to another embodiment of the disclosure.

It is to be noted that, in the embodiment of the disclosure, the receiving unit 1101 may be implemented by a receiver, the sending unit 1103 may be implemented by a sender, and the determination unit 902 may be implemented by a processor. As illustrated in FIG. 13, device 1200 may include a processor 1201, a receiver 1202, a sender 1202 and a memory 1204. Herein, the memory 1204 may be configured to store a corresponding relationship among an identity credential of a user, an ID of the user and a priority of the identity credential, and may further be configured to store codes executed by the processor 1201 and the like.

Each component in the device 1200 is coupled together through a bus system 1205, which includes a data bus, and further includes a power bus, a control bus and a state signal bus.

The device 1100 illustrated in FIG. 12 or the device 1200 illustrated in FIG. 13 may implement each process implemented in the identity authentication server in the embodiments illustrated in FIG. 1 and FIG. 3 to FIG. 7, which will not be elaborated herein to avoid repetition.

Those skilled in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solution. Those skilled in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiment for convenient and brief description and will not be elaborated herein.

In some embodiments provided by the disclosure, it should be understood that the disclosed system, device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art may be embodied in form of software product, and the computer software product is stored in a storage medium, including a plurality of instructions configured to enable a piece of computer device (which may be a personal computer, a server, network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A user identity authentication method, comprising:
acquiring, by an identity authentication server, a user request from a Service Provider (SP) device, the user request comprising an identity credential of a user;
determining, by the identity authentication server, an Identifier (ID) of the user and a priority of the identity credential according to the user request; and
sending, by the identity authentication server, the ID of the user and the priority of the identity credential to the SP device for enabling a corresponding service for the user;
wherein the identity credential comprises a primary credential and a secondary credential,
wherein the primary credential comprises at least one of: a DeoxyriboNucleic Acid (DNA), a fingerprint, an iris and a voiceprint,
wherein the secondary credential comprises at least one of: a digital certificate, a digital signature, a user card and a password, and
wherein a priority of the primary credential is higher than a priority of the secondary credential.

2. The method according to claim 1, wherein the identity credential is generated at a terminal by processing with a generation method, and
wherein the determining an ID of the user and a priority of the identity credential according to the user request comprises:
processing the identity credential by adopting a verification method; and
acquiring the ID and the priority corresponding to the processed identity credential according to a prestored corresponding relationship.

3. A user identity authentication method, comprising:
receiving, by a terminal, an identity credential input by a user;
determining, by the terminal, an Identity (ID) of the user and a priority of the identity credential according to the identity credential;
acquiring, by the terminal, subscription information of the user according to the ID of the user; and
determining a service corresponding to the priority of the identity credential according to the subscription information;
wherein the identity credential comprises a primary credential and a secondary credential,
wherein the primary credential comprises at least one of: a DeoxyriboNucleic Acid (DNA), a fingerprint, an iris and a voiceprint,
wherein the secondary credential comprises at least one of: a digital certificate, a digital signature, a user card and a password, and wherein a priority of the primary credential is higher than a priority of the secondary credential.

4. The method according to claim 3, wherein before the terminal receives the identity credential input by the user, the method further comprises:
receiving, by the terminal, first selection information input by the user, the first selection information indicating a first operator selected by the user;
receiving, by the terminal, a user request input by the user, the user request comprising the identity credential; and
sending, by the terminal, the user request to a first Service Provider (SP) device of the first operator.

5. The method according to claim 4, further comprising:
after the first SP device indicates that the identity credential of the terminal passes authentication, accessing, by the terminal, a network of the first operator through the first SP device.

6. The method according to claim 4, further comprising:
acquiring, by the terminal, the subscription information of the user through the first SP device.

7. The method according to claim 4, further comprising at least one of the following:
receiving, by the terminal, a first corresponding relationship sent by the first SP device, the first corresponding relationship comprising a corresponding relationship among the ID of the user, the identity credential and the priority of the identity credential;
or,
receiving, by the terminal, a second corresponding relationship sent by the first SP device, the second corresponding relationship comprising a corresponding relationship between the priority of the identity credential and the service.

8. The method according to claim 4, further comprising:
receiving, by the terminal, an instruction of the user, the instruction indicating that the user is to reselect an operator;
receiving, by the terminal, second selection information of the user, the second selection information indicating a second operator selected by the user;
sending, by the terminal, the user request to a second SP device of the second operator; and
after the second SP device indicates that the terminal passes authentication, accessing, by the terminal, a network of the second operator through the second SP device.

9. The method according to claim 4, further comprising:
receiving, by the terminal, a temporary quitting instruction of the user; and
suspending, by the terminal, user data of the user according to the temporary quitting instruction.

10. The method according to claim 3, further comprising:
receiving, by the terminal, a service request of the user; and
when a service indicated by the service request is not the service corresponding to the priority of the identity credential, denying, by the terminal, the service request,
wherein the denying, by the terminal, the service request comprises:
presenting, by the terminal, prompting information, the prompting information being configured to indicate the user to input another identity credential corresponding to the service indicated by the service request.

11. The method according to claim 3, further comprising:
receiving, by the terminal, a user credential input by another user; and determining, by the terminal, another service corresponding to the identity credential input by the another user to enable the another user to use the another service through the terminal.

12. The method according to claim 3, further comprising:
receiving, by the terminal, a permanent deactivation instruction of the user; and
deleting, by the terminal, the user data of the user according to the permanent deactivation instruction.

13. A terminal, comprising:
a receiver, configured to receive an identity credential input by a user;
a processor; and
a memory, configured to store codes executed by the processor;
wherein the processor is configured to:
determine an Identity (ID) of the user and a priority of the identity credential according to the identity credential;
acquire subscription information of the user according to the ID of the user; and
determine a service corresponding to the priority of the identity credential according to the subscription information;
wherein the identity credential comprises a primary credential and a secondary credential,
wherein the primary credential comprises at least one of: a DeoxyriboNucleic Acid (DNA), a fingerprint, an iris and a voiceprint,
wherein the secondary credential comprises at least one of: a digital certificate, a digital signature, a user card and a password, and
wherein a priority of the primary credential is higher than a priority of the secondary credential.

14. The terminal according to claim 13, further comprising a sender, wherein
the receiver is further configured to receive first selection information input by the user, the first selection information indicating a first operator selected by the user;
the receiver is further configured to receive a user request input by the user, the user request comprising the identity credential; and
the sender is configured to send the user request to a first Service Provider (SP) device of the first operator.

15. The terminal according to claim 14, wherein the receiver is further configured to perform at least one of the following:
acquire the subscription information of the user through the first SP device;
receive a first corresponding relationship sent by the first SP device, the first corresponding relationship comprising a corresponding relationship among the ID of the user, the identity credential and the priority of the identity credential; or
receive a second corresponding relationship sent by the first SP device, the second corresponding relationship comprising a corresponding relationship between the priority of the identity credential and the service.

16. The terminal according to claim 14, wherein
the receiver is further configured to receive an instruction of the user, the instruction indicating that the user is to reselect an operator;
the receiver is further configured to receive second selection information of the user, the second selection information indicating a second operator selected by the user;
the sender is further configured to send the user request to a second SP device of the second operator; and the processor is further configured to, in response to an indication from the second SP device that the terminal passes authentication, access a network of the second operator through the second SP device.

17. The terminal according to claim 14, wherein
the receiver is further configured to receive a temporary quitting instruction of the user; and
the processor is further configured to suspend user data of the user according to the temporary quitting instruction.

18. The terminal according to claim 13, wherein
the receiver is further configured to receive a service request of the user; and
the processor is configured to, when a service indicated by the service request is not the service corresponding to the priority of the identity credential, deny the service request, including: presenting prompting information, the prompting information being configured to indicate the user to input another identity credential corresponding to the service indicated by the service request.

19. The terminal according to claim 13, wherein
the receiver is further configured to receive a user credential input by another user; and
the processor is further configured to determine another service corresponding to the identity credential input by the another user to enable the another user to use the other service through the terminal.

20. The method according to claim 4, wherein the sending the user request to the first SP device comprises:
processing the identity credential by adopting a predefined generation method; and
sending the processed identity credential to the first SP device.

\* \* \* \* \*